United States Patent [19]

El-Sherif

[11] Patent Number: 4,842,405
[45] Date of Patent: Jun. 27, 1989

[54] PROCESS FOR PRODUCING A GRATING ON AN OPTICAL FIBER

[76] Inventor: Mahmoud El-Sherif, 131 Linwood Ave., Ardmore, Pa. 19003

[21] Appl. No.: 34,339

[22] Filed: Apr. 3, 1987

[51] Int. Cl.$^4$ .......................... G02B 27/00; G02B 6/18
[52] U.S. Cl. .................. 350/320; 350/96.31; 350/162.17; 350/3.7
[58] Field of Search ........... 350/320, 321, 164, 162.17, 350/162.21, 162.2, 162.24, 96.19, 96.31, 3.7; 356/358

[56] References Cited

U.S. PATENT DOCUMENTS

| | | | |
|---|---|---|---|
| 3,891,302 | 6/1975 | Dabby et al. | 350/96.31 |
| 4,289,381 | 9/1981 | Garvin et al. | 350/320 |
| 4,403,827 | 9/1983 | Bryan et al. | 350/162.17 |
| 4,660,934 | 4/1987 | Akiba et al. | 350/162.17 |
| 4,687,286 | 8/1987 | Winful | 350/96.19 |

Primary Examiner—Bruce Y. Arnold
Assistant Examiner—Loha Ben

[57] ABSTRACT

A method for imparting a diffraction grating into the cladding layer and core layer of small diameter optical fibers consisting of (a) etching a section of an optical fiber to reduce the thickness of the cladding layer of the optical fiber, (b) coating the etched portion of the fiber with a photoresist, exposing the photoresist to produce the diffraction grating pattern using on-axis interferometry using a laser source (d) dissolving the non-exposed photoresist and (e) etching the diffraction grating pattern into the cladding layer and/or core of the optical fiber.

7 Claims, 1 Drawing Sheet

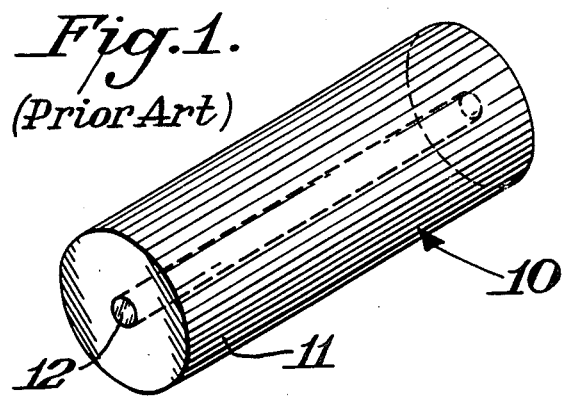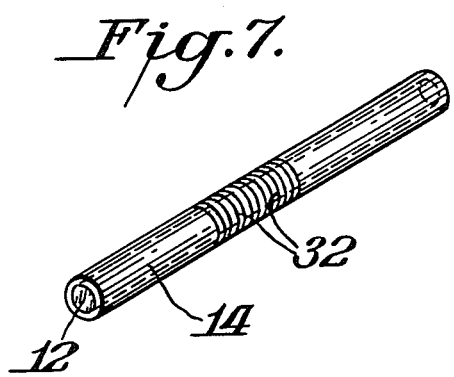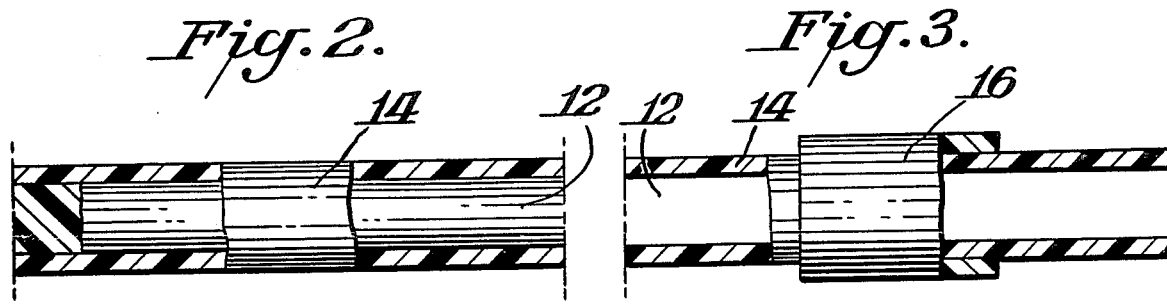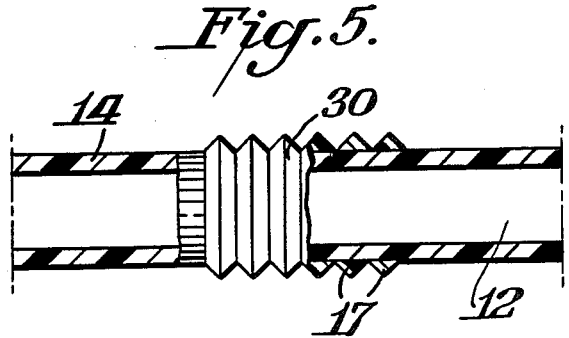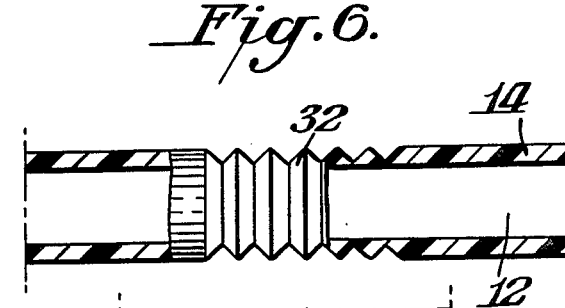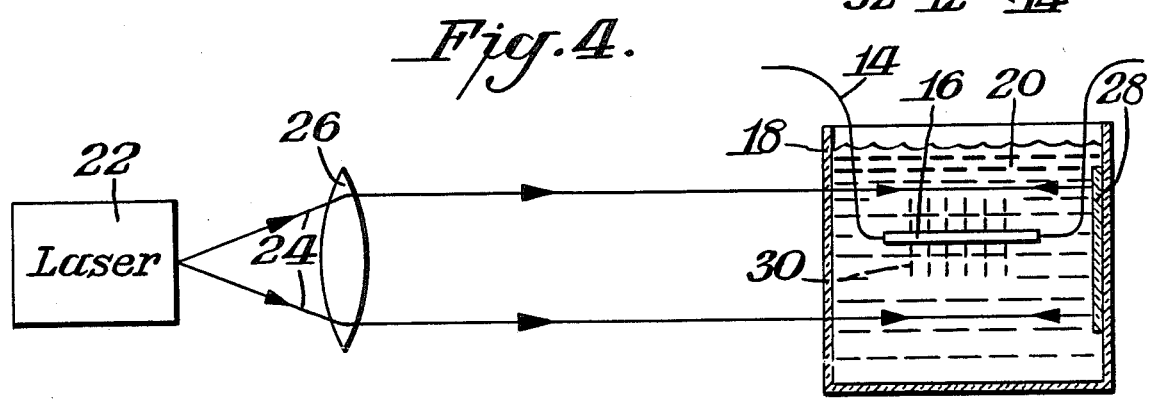

PROCESS FOR PRODUCING A GRATING ON AN OPTICAL FIBER

BACKGROUND OF THE INVENTION (a) Field of the Invention

This invention relates to fiber optics and more particularly to a method of etching a diffraction grating on an optical fiber for uses including in fiber optic grating couplers.

(b) Brief Description of the Prior Art

Since about 1980, the use of fiber optics for telecommunications has been rapidly expanding. It is desirable to impart a diffraction grating pattern on the surface of an optical fiber. The diffraction grating is used as a means of introducing a signal into the optical fiber for transmission and for coupling of fiber optics.

The methods available of producing a diffraction grating on the surface of an optical fiber are essentially limited to producing a grating on a flattened portion of the fiber and the grating thus produced covers only about 50 percent of the surface of the optical fiber in the section whose grating is imposed on the fiber.

I have invented a new method of forming a diffraction grating on the entire cylindrical surface of the thin wall cladding in the region of the grating covers. By imposing the grating on the entire surface of the optical fiber, the coupling efficiency of a signal into the optical fiber is vastly increased. My method provides a low cost method of producing the diffraction grating with high reliability and uniformity of grating pattern.

Another use of the improved optical fiber grating is to separate closely spaced optical wave lengths providing a means to use light of different wavelengths to transmit different data.

SUMMARY OF THE INVENTION

This invention is directed to a process for producing a diffraction grating on a section of an optical fiber wherein the diffraction grating covers the entire cylindrical surface of the section comprising:

(a) coating said section of the optical fiber with a photoresist;

(a) exposing the photoresist coated optical fiber to an interference pattern produced from a laser light source;

(c) developing the exposed photoresist to produce therein the interference pattern on the surface of the optical fiber; and (d) etching into the surface of optical fiber.

BRIEF DESCRIPTION OF THE DRAWING

FIG. 1 is a pictorial view of a section of a typical single mode optical fiber.

FIG. 2 is a side elevational view partially broken away of the optical fiber of FIG. 1 having the cladding portion of the fiber substantially reduced in thickness.

FIG. 3 is a side-elevational view partially broken away showing the optical fiber of FIG. 2 having a photoresist applied to a section thereof and covering the entire surface of said section.

FIG. 4 is a schematic diagram showing the simultaneous exposure and etching process described herewith the photoresist coated optical fiber of FIG. 3.

FIG. 5 is a side-elevational view partially broken away showing the optical fiber after exposure to the interference pattern produced by the laser and after dissolution of the unexposed and unpolymerized photoresist.

FIG. 6 is a side elevational view partially broken away showing the product of the process being the optical fiber with the interference pattern produced by the laser duplicated as the diffraction grating pattern etched into a section of the entire surface of the cladding of the optical fiber.

FIG. 6A is a side elevational view partially broken away showing another embodiment of the invention showing the etching of the diffraction grating extending through the thinned cladding of the optical fiber to the interface of the core and cladding.

FIG. 7 is a pictorial view of the optical fiber of FIG. 6 showing the grating produced by the process described herein.

DESCRIPTION OF THE INVENTION

FIG. 1 shows a typical single mode optical fiber 10 with a core section 12 surrounded by a cladding section 11. This process of my invention produces an optical fiber as shown in FIG. 7 having a small section, 1 to 2 millimeters in length, having a reduced cladding thickness 14 with a diffraction grating 32 etched into the cladding and covering. The entire surface of said section.

The process uses the interference pattern which can be produced by reflecting the laser beam back upon itself to expose an optical fiber coated with a photoresist followed by development of the exposed photoresist and then etching of the interference pattern produced in the developed photoresist to produce a diffraction pattern or grating in the cladding of the optical fiber.

The first step of my process is to reduce the thickness of the cladding material in a section of the optical fiber to about 1 to 2 microns as shown in FIG. 2 where the thinner cladding 14 is shown. This can be done by chemically etching or other etching means on the optical fiber 10. Reproduceable results can be obtained by determining the rate of etching of the etchant and then carefully timing the etching time.

The next step is to apply a photoresist and preferably a liquid photoresist uniformly to the entire surface of a section of the optical fiber where the grating is to be applied. The length of the section to which the grating is to be applied is generally about 1 to 2 millimeters in length. FIG. 3 shows the photoresist 16 applied to the optical fiber. The coated fiber can be placed in an apparatus shown in FIG. 4 where a laser 22 produces a light beam 24 which can be focused by lens 26 to pass into a transparent holder of the coated optical fiber of FIG. 4 and arranged so that the lengthwise axis of the fiber is parallel to the light beam of the laser. The laser beam is arranged to strike a reflecting surface 28 placed perpendicular to the direction of the laser beam thereby creating an interference pattern 30 at the area of the photoresist coating on the optical fiber. The interference pattern exposes the photoresist to duplicate the interference pattern on development of the exposed photoresist by conventionally known means.

FIG. 5 shows the diffraction pattern 30 reproduced in the developed photoresist 17 in the form of a sinusoidal, triangular, or other pattern having peaks and valleys which is preferred.

FIG. 6 and 6A show the grating 32 etched into the cladding 14 formed by subjecting the developed pattern shown in FIG. 5 to chemical etching. In FIG. 6, the etching extends into the cladding which has a thickness of about 1 to 2 microns. FIG. 6A shows a preferred embodiment of the invention where the etching extends to the interface of the core and cladding.

The exposure and development of the photoresist can be done individually or it can be done simultaneously as taught by Trang and Wang, Applied Physics Letters, Vol. 24, No. 4, Page 196. (Feb. 15, 1974). The simultaneous exposure and development is shown in FIG. 4 where the coated fiber of FIG. 3 is exposed and developed by being placed in a laser beam 24 from a laser 22 which is passed through a lens 26 which focuses the light beam so that it is passed into a transparent container 18 holding the development liquid 20 which is transparent to the laser light beam. The mirror 28 reflects the laser light beam back upon itself preferably inside the transparent container 18 to produce the interference pattern 30, as an optical standing wave.

Etching of the diffraction pattern into the optical fiber will depend upon the composition of the optical fiber. Chemical etching, plasma etching and ion milling which are well known in the art can be employed. For example, an optical fiber composed of glass can be etched with either ion milling or with hydrofluoric acid.

The process is not limited to operation on a single optical fiber. Many fibers can be placed in the path of the laser beam and each exposed at the same time.

The period of the grating can be controlled in the simultaneous exposure and development method by changing the index of refraction of the developer;

The method of my invention can be used with optical fibers having cores with diameters as small as 2 to 6 $\mu$m.

The advantages obtained by my process result from the uniformity of the light intensity produced by interference pattern. Uniform light exposure on the entire cylindrical surface of the optical fiber is obtained which eliminates distortions in the grating.

I claim:

1. A process for producing a diffraction grating pattern on a section of an optical fiber wherein the diffraction grating pattern covers the entire cylindrical surface of said section comprising:
   (a) etching a section of the optical fiber having a cladding layer and a core layer to reduce the thickness of the cladding layer to up to 2 microns in thickness;
   (b) coating said section of the optical fiber with a photoresist;
   (c) exposing the photoresist coated optical fiber to an interference pattern produced from a laser light source;
   (d) developing the exposed photoresist to produce therein the diffraction grating pattern on the section of the optical fiber; and
   (e) etching the diffraction grating pattern into the surface of said section.

2. The process of claim 1 wherein the optical fiber used is a single mode optical fiber having a core covered by a cladding material having the cladding material reduced in thickness to 1 to 2 microns.

3. The process of claim 2 comprising:
   (a) applying a liquid photoresist to the surface of said section,
   (b) exposing the photoresist coated optical fiber to said interference pattern formed by reflecting the beam of a laser upon a reflecting surface placed perpendicular to the direction of said laser beam,
   (c) developing the exposed photoresist to reproduce the intereference pattern on the surface of said section, and
   (d) etching said intesference pattern into the cladding material of said section.

4. The process of claim 3 comprising exposing and developing the photoresist simultaneously.

5. The process of claim 2 wherein the optical fiber is a single mode optical fiber having a core with a diameter of 2 to 6 $\mu$m.

6. The process of claim 3 wherein the section of the optical fiber coated with a photoresist is 1 to 2 millimeters in length.

7. The process of claim 2 wherein the cladding material is reduced in thickness to 1 to 2 microns.

* * * * *